(12) United States Patent
Shalaby et al.

(10) Patent No.: US 8,827,304 B2
(45) Date of Patent: Sep. 9, 2014

(54) VERSATILE, COLLAPSIBLE CART-TRAILER WITH MODULAR COMPONENTS

(71) Applicant: Commonwheel Ventures, LLC, Cambridge, MA (US)

(72) Inventors: Nadia Shalaby, Cambridge, MA (US); Matteo Visentin, Brighton, MA (US)

(73) Assignee: Commonwheel Ventures, LLC, Cambridge, MA (US)

( * ) Notice: Subject to any disclaimer, the term of this patent is extended or adjusted under 35 U.S.C. 154(b) by 0 days.

(21) Appl. No.: 13/745,396

(22) Filed: Jan. 18, 2013

(65) Prior Publication Data

US 2013/0127136 A1    May 23, 2013

Related U.S. Application Data

(63) Continuation of application No. 12/628,573, filed on Dec. 1, 2009, now Pat. No. 8,376,381.

(60) Provisional application No. 61/200,598, filed on Dec. 1, 2008.

(51) Int. Cl.

| | | |
|---|---|---|
| B62B 1/00 | (2006.01) |
| B62B 7/06 | (2006.01) |
| B62B 3/12 | (2006.01) |
| B62K 27/00 | (2006.01) |
| B62K 27/12 | (2006.01) |
| B62B 5/00 | (2006.01) |

(52) U.S. Cl.
CPC .............. *B62K 27/003* (2013.01); *B62B 3/12* (2013.01); *B62K 27/12* (2013.01); *B62B 5/00* (2013.01)
USPC .............................. 280/654; 280/656; 280/38

(58) Field of Classification Search
CPC .............. B62B 1/12; B62B 1/00; B62B 1/14; B62B 1/16; B62B 1/20; B62B 1/22; B62B 1/24; B62B 1/125; B62B 2202/404; B62K 27/003; B62K 27/00
USPC ......... 280/482, 654, 400, 204, 493, 209, 292, 280/288.4, 656, 38
See application file for complete search history.

(56) References Cited

U.S. PATENT DOCUMENTS 3,012,796 A * 12/1961 Mieding ........................ 280/204
3,829,125 A *  8/1974 Davis ............................ 280/204
(Continued)

FOREIGN PATENT DOCUMENTS

EP    0317673 A1    5/1989
EP    1600353 A2    11/2005
(Continued)

OTHER PUBLICATIONS

International Search Report and Written Opinion issued Jul. 2, 2010 in corresponding PCT Application No. PCT/US2009/066069.
(Continued)

*Primary Examiner* — Jeffrey J Restifo
*Assistant Examiner* — James M Dolak
(74) *Attorney, Agent, or Firm* — Burns & Levinson LLP; Steven M. Mills

(57) ABSTRACT

A collapsible cart-trailer includes a folding mechanism that folds the cart-trailer into a small form factor, at least two wheels, modular, and removable and compartmentalized storage. The collapsible cart-trailer is operable in a cart mode and a trailer mode. In the trailer mode, the cart-trailer may be coupled to a movable object by a collapsible, length adjustable tow bar. In the cart mode, the cart-trailer includes a collapsible handle.

11 Claims, 17 Drawing Sheets

(56) References Cited

U.S. PATENT DOCUMENTS

| | | | |
|---|---|---|---|
| 4,037,853 A * | 7/1977 | Sparks | 280/204 |
| 4,077,646 A | 3/1978 | Watkins | |
| 4,128,252 A * | 12/1978 | Raniero | 280/40 |
| 4,174,120 A * | 11/1979 | Freeman | 280/204 |
| 4,342,467 A * | 8/1982 | Kester | 280/204 |
| 4,371,184 A * | 2/1983 | Henden et al. | 280/204 |
| 4,550,930 A * | 11/1985 | Proffit | 280/655 |
| 4,717,168 A * | 1/1988 | Moon, Sr. | 280/641 |
| 4,759,559 A * | 7/1988 | Moulton | 280/40 |
| 4,865,346 A * | 9/1989 | Carlile | 280/655 |
| 5,005,847 A * | 4/1991 | King et al. | 280/47.19 |
| 5,242,178 A | 9/1993 | Galasso et al. | |
| 5,482,304 A * | 1/1996 | Smith | 280/204 |
| 5,636,852 A * | 6/1997 | Sistrunk et al. | 280/30 |
| 5,785,334 A * | 7/1998 | Robinson | 280/204 |
| 5,791,670 A * | 8/1998 | Hunker | 280/204 |
| 5,810,378 A * | 9/1998 | Brinkley | 280/204 |
| 5,816,349 A * | 10/1998 | Hankins | 280/204 |
| 5,944,333 A * | 8/1999 | Kent | 280/204 |
| 6,305,703 B1 | 10/2001 | Quick et al. | |
| 6,561,529 B2 * | 5/2003 | Darling, III | 280/79.2 |
| 7,017,939 B2 * | 3/2006 | Darling, III | 280/652 |
| 7,500,681 B2 * | 3/2009 | Steadman | 280/47.131 |
| 8,523,219 B2 * | 9/2013 | Freeman et al. | 280/655 |

FOREIGN PATENT DOCUMENTS

| | | |
|---|---|---|
| JP | 3060071 | 4/1999 |
| KR | 20-0437559 | 12/2007 |

OTHER PUBLICATIONS

International Search Report and Written Opinion issued Jul. 6, 2010 in corresponding PCT Application No. PCT/US2009/066208.

* cited by examiner

VERSATILE, COLLAPSIBLE CART-TRAILER WITH MODULAR COMPONENTS

RELATED APPLICATIONS

This application is a continuation of U.S. patent application Ser. No. 12/628,573, filed in the United States Patent and Trademark Office (USPTO) on Dec. 1, 2009, which claims the benefit of U.S. Provisional Patent Application No. 61/200,598, filed in the USPTO on Dec. 1, 2008, the entire contents of which applications are incorporated herein by reference.

TECHNICAL FIELD

The present invention is related to a versatile, collapsible cart-trailer with modular components. More particularly, the present invention is related to a cart-trailer having a collapsible tow bar, collapsible handle, a tripod assembly, a castor assembly, a modular platform and a modular accessory support system.

BACKGROUND

With environmental awareness and the need to reduce our carbon footprint as a society, there has been an increasing need in transportation alternatives to driving. One such alternative is that people are riding bicycles, are walking, or are taking public transportation. However, when people are carrying or delivering goods, a device becomes necessary to facilitate carrying and delivery of the goods. Conventional means for transporting goods with a bicycle have been bicycle accessories mounted directly to the bicycle, which suffer from lack of volume and inadequate weight constraints. Another conventional means for transporting goods with a bicycle is bicycle trailers. Conventional means for transporting goods while walking, or via public transportation has been a cart. In these conventional means, the conversion from cart to trailer and trailer to cart has not been possible. Additionally, the conventional cart or trailer has not been collapsible, or if foldable to an extent, still retain a fairly large form factor. Moreover, the means of carrying goods on these conventional carts or trailers has been in a pre-defined, constrained, non-compartmentalized space, which could not be changed by the user to accommodate various uses and forms of goods. Furthermore, the trailers are not conventionally configured for any versatile bicycle, and the carts are conventionally not designed to be adjustable for the ergonomic needs of different users.

SUMMARY

In one aspect of the present invention, a universal multi-modal utility cart for transporting goods includes a folding mechanism that folds the utility cart into a small form factor, at least two wheels, and modular, removable and compartmentalized storage. The utility cart is operable by multiple modes of transportation.

In one embodiment, the utility cart includes a rigid frame and a modular accessory support system.

In another embodiment, the folding mechanism automatically folds the modular accessory support system when folding the utility cart.

In another embodiment, the modular accessory support system attaches to the storage, wherein the storage comprises modular baskets and the modular baskets click firmly into place onto the modular accessory support system and are removable from the modular accessory support system with and without loaded goods.

In one embodiment, accessories coupling the storage to the frame are clipable onto the frame.

In one embodiment, the folding mechanism includes a collapsible handle, a tripod assembly coupled to the collapsible handle comprising a length-adjustable vertical extrusion and a castor assembly, a foot pedal coupled to the tripod assembly for disengaging a locking mechanism of the utility cart, and a horizontal platform foldable automatically and synchronously with the folding mechanism. The collapsible handle initiates length adjustment of the vertical extrusion and folding of the utility cart, and the folding mechanism automatically collapses the at least two wheels, the castor assembly and the vertical extrusion such that the utility cart is folded into a form factor.

In another embodiment, the castor assembly comprises at least one wheel smaller than the at least two wheels.

In one embodiment, the utility cart is operable via a cart mode.

In one embodiment, the utility cart is operable in a trailer mode by hitching the utility cart to a movable object.

In another embodiment, the movable object is a bicycle. In another embodiment, the cart is hitched to the movable object using a collapsible and extendable tow bar. In another embodiment, the tow bar is connected to the movable object by a hitch.

In another embodiment, the tow bar is adjustable in length and telescoping.

In another embodiment, the tow bar includes a first telescopic channel, a first adjuster for adjusting a length and angle of the first telescopic channel and locking the first telescopic channel into place, a second telescopic channel, a second adjuster coupling the first telescopic channel to the second telescopic channel for adjusting a length and angle of the second telescopic channel and locking the second telescopic channel into place, and a third adjuster coupled to the second telescopic channel for adjusting a position of the tow bar. The first telescopic channel is insertable into a hollow groove of the second telescopic channel.

In another embodiment, the storage includes loads of variable shapes and sizes.

In another aspect of the present invention a tow bar includes a first telescopic channel, a first adjuster for adjusting a length and angle of the first telescopic channel and locking the first telescopic channel into place, a second telescopic channel, a second adjuster coupling the first telescopic channel to the second telescopic channel for adjusting a length and angle of the second telescopic channel and locking the second telescopic channel into place, and a third adjuster coupled to the second telescopic channel for adjusting a position of the tow bar. The first telescopic channel is insertable into a hollow groove of the second telescopic channel.

In another aspect of the present invention, a folding mechanism includes a collapsible handle, a tripod assembly coupled to the collapsible handle comprising a length-adjustable vertical extrusion and a castor assembly, and at least two wheels coupled to the tripod assembly. The collapsible handle initiates length adjustment of the vertical extrusion and folding of the device, and the at least two wheels, the castor assembly and the vertical extrusion automatically collapse when the folding mechanism is engaged.

In one embodiment, the folding mechanism further includes a modular support system which is automatically collapsed when the folding mechanism is engaged.

In one embodiment, the folding mechanism further includes a foot pedal coupled to the tripod assembly for disengaging a locking mechanism of the folding mechanism.

In one embodiment, the folding mechanism further includes a horizontal platform foldable automatically when the folding mechanism is engaged.

BRIEF DESCRIPTION OF DRAWINGS

The foregoing and other features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
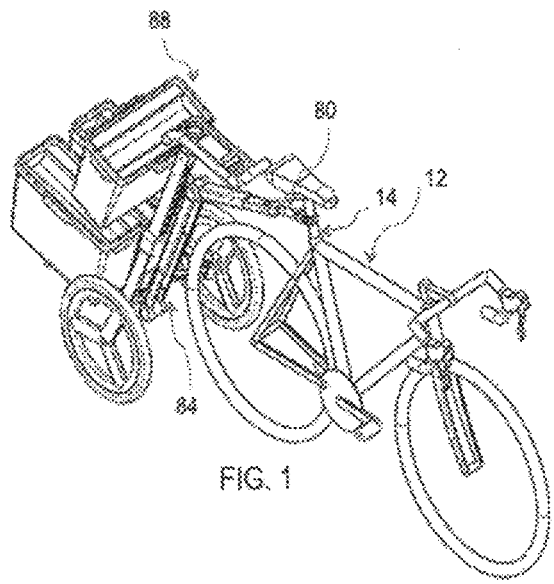
FIG. 1 illustrates a perspective view of a system in accordance with an exemplary embodiment of the present invention.
Figure 2:
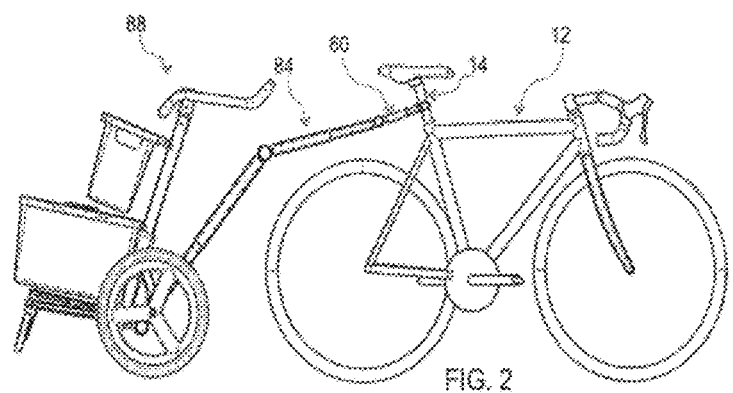
FIG. 2 illustrates a side view the system of FIG. 1 in accordance with an exemplary embodiment of the present invention.
Figure 3:
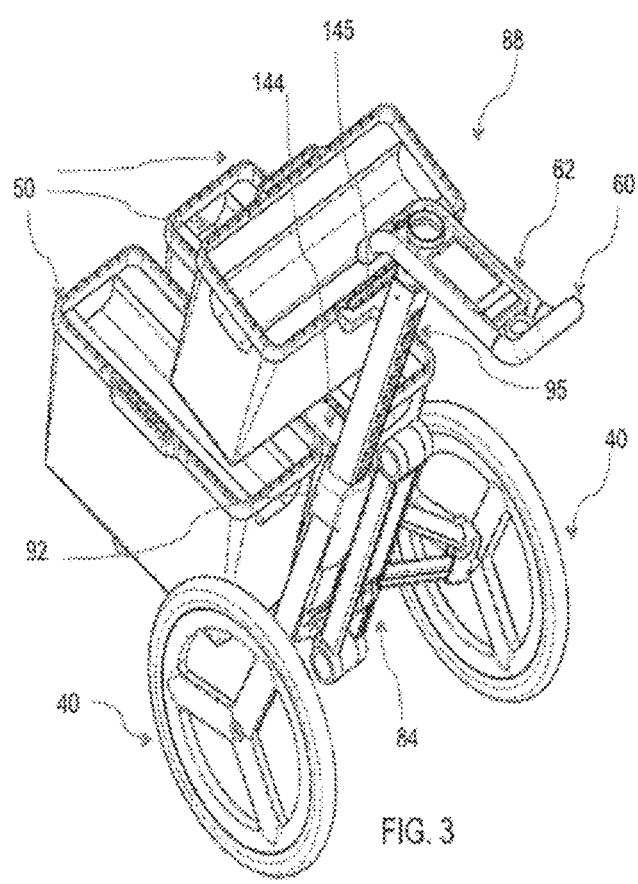
FIG. 3 illustrates a perspective view of a modular cart-trailer with a collapsible tow bar of FIG. 1, in accordance with an exemplary embodiment of the present invention.
Figure 7:
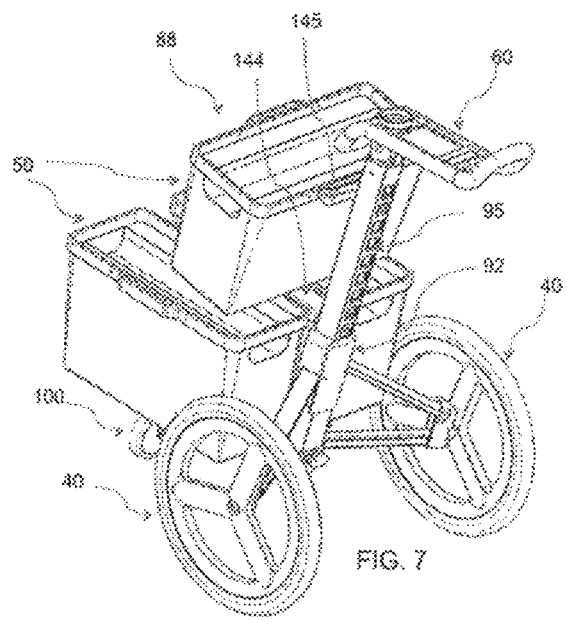
FIG. 7 illustrates a perspective view of a modular cart-trailer, in accordance with an exemplary embodiment of the present invention.

A modular cart-trailer 88 is usable as a cart, in a walking mode or via public transportation, as illustrated in FIG. 7, as well as a trailer, in conjunction with a bicycle 12, a collapsible tow bar 84 and a universal hitch 80, as illustrated in FIG. 1. The perspective view of FIG. 1 and the side view of FIG. 2 both illustrate the universal hitch 80 attached to a seat post 14 of the bicycle 12. The rear of the universal hitch 80 is connected to a collapsible tow bar 84, which is in turn attached to the modular cart-trailer 88. The universal hitch 80 may be a universal hitch such as the universal hitch described in U.S. patent application Ser. No. 12/627,241, filed Nov. 30, 2009, the content of which is incorporated herein by reference in its entirety. FIG. 3 illustrates the modular cart-trailer 88 in a cart mode. One means for transforming the modular cart-trailer 88 from the modular cart mode to a modular trailer mode is to connect the modular cart-trailer 88 to the collapsible tow bar 84, which then hitches to the bicycle seat post 14, via the universal hitch 80, as illustrated in FIG. 1 and FIG. 2. The modular cart-trailer 88 may be converted from the trailer mode into the cart mode by disconnecting the collapsible tow bar 84 from the seat post 14 of the bicycle 12 and folding it alongside the vertical axis of the modular cart-trailer 88, as illustrated in FIG. 3. Another means for transforming the modular cart-trailer 88 from the trailer mode into the cart mode is to disconnect the collapsible tow bar 84 from the modular cart-trailer 88, as illustrated in FIG. 7. Thus, the collapsible tow bar 84 and universal hitch 80 components are not necessary for the modular cart-trailer to operate in the cart mode, as illustrated in FIG. 7.

The modular cart-trailer 88 permits easy transformation from the trailer mode to the cart mode and vise versa. In addition, the modular cart-trailer 88 is easily collapsible such that the modular cart-trailer 88 can be easily stowed away in, for example, a motor vehicle. Specifically, the modular cart-trailer 88 can be stowed away in a motor vehicle by removing modular baskets 50, loading the modular baskets 50 into the motor vehicle, folding the utility cart, and loading the folded utility cart into the motor vehicle. Further, the modular cart-trailer 88 permits for an increase in volume of goods that can be transported and permits for compartmentalization of goods.

Figure 8:
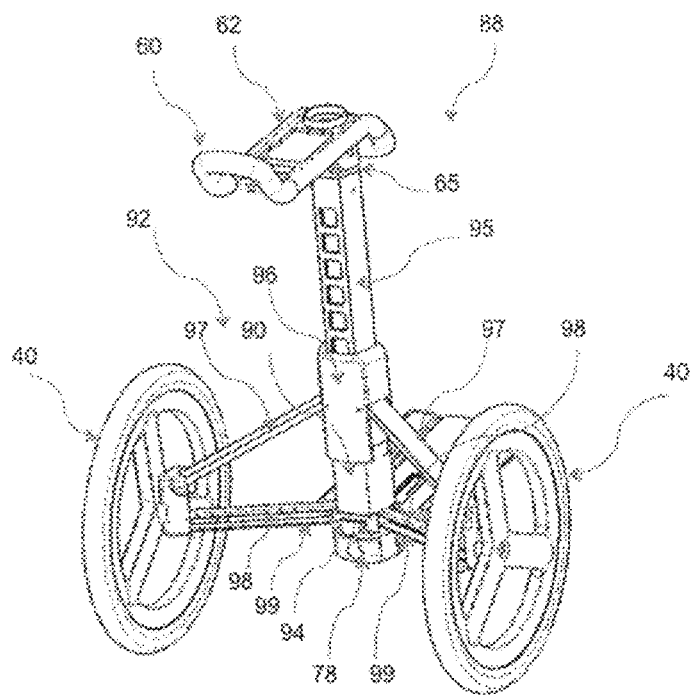
FIG. 8 illustrates a rear, perspective view of a modular cart-trailer without any mounted components, in accordance with an exemplary embodiment of the present invention.

The modular cart-trailer 88 may be used to transport and deliver goods or cargo of any kind. The versatility of the modular cart-trailer 88 is due to a modular system of attachments, adjustable to form various configurations. The modular attachments may be simple baskets, bags, or any other specialized containers or devices. This enables the modular cart-trailer 88 to be versatile and serve many different user needs. FIG. 3 and FIG. 7 illustrate the perspective view of the modular cart-trailer 88, with two rear wheels 40, a tripod assembly 92, including a main collapsing mechanism, vertical extrusion 95, into which a modular system of attachments is incorporated, a handle 60 to maneuver the modular cart-trailer 88 when in cart mode, and modular baskets 50, as an example of modular attachments. Additionally, FIG. 3 shows the collapsible tow bar 84 in collapsed mode along the tripod chassis 90, as illustrated in FIG. 8. The modular attachments are illustrated as modular baskets 50, however, the present invention is not limited thereto. The modular baskets 50 may be bags or any other containers or devices. The modular baskets 50 are removable from the modular cart-trailer 88 with or without goods. In addition, the modular cart-trailer 88 is described as having two wheels 40, however, the modular cart-trailer 88 may have additional wheels.

Figure 9A:
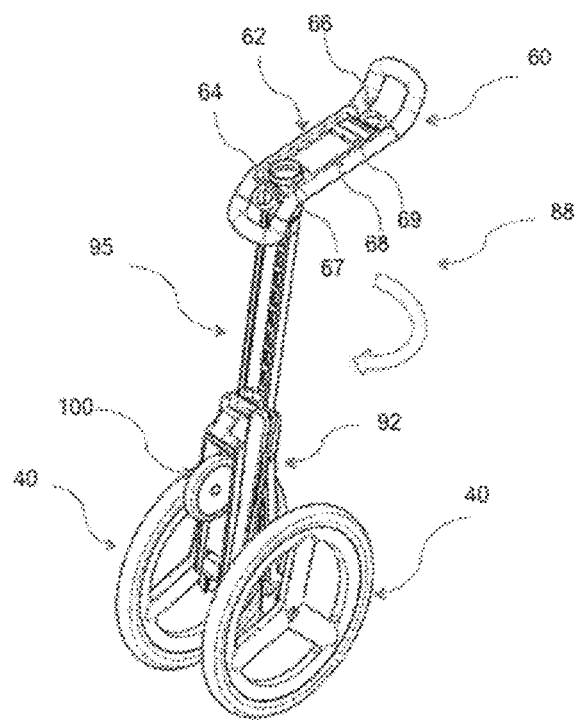
FIG. 9A illustrates a perspective view of the modular cart-trailer of FIG. 8 with a collapsed castor assembly, in accordance with an exemplary embodiment of the present invention.
Figure 9B:
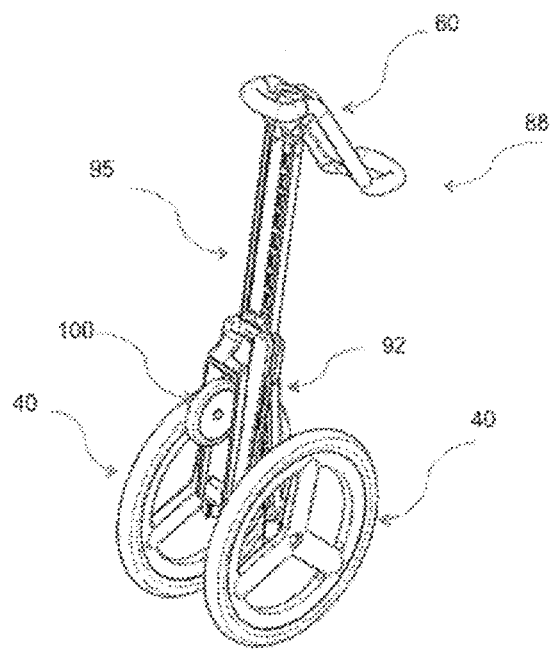
FIG. 9B illustrates a perspective view of the modular cart-trailer of FIG. 9A with a half rotated handle, in accordance with an exemplary embodiment of the present invention.
Figure 9C:
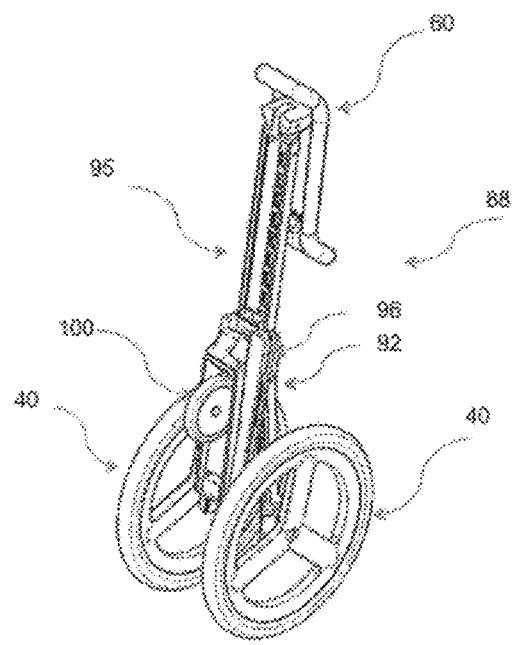
FIG. 9C illustrates a perspective view of the modular cart-trailer of FIG. 9B with a fully collapsed handle, in accordance with an exemplary embodiment of the present invention.
Figure 9D:
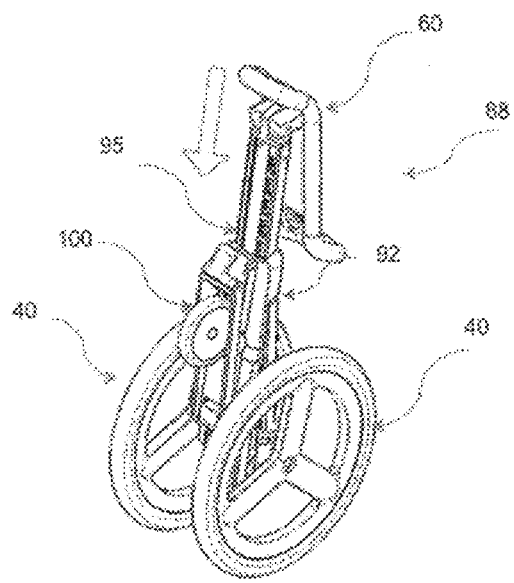
FIG. 9D illustrates a perspective view of the modular cart-trailer of FIG. 9C with a half collapsed vertical extrusion, in accordance with an exemplary embodiment of the present invention.
Figure 9E:
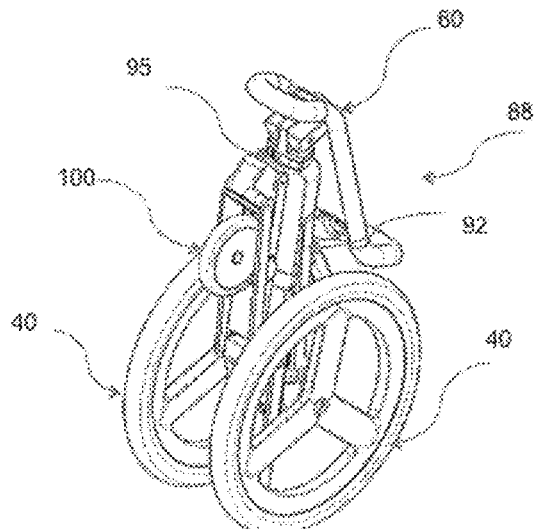
FIG. 9E illustrates a perspective view of the modular cart-trailer of FIG. 9D with a fully collapsed vertical extrusion, in accordance with an exemplary embodiment of the present invention.
Figure 13:
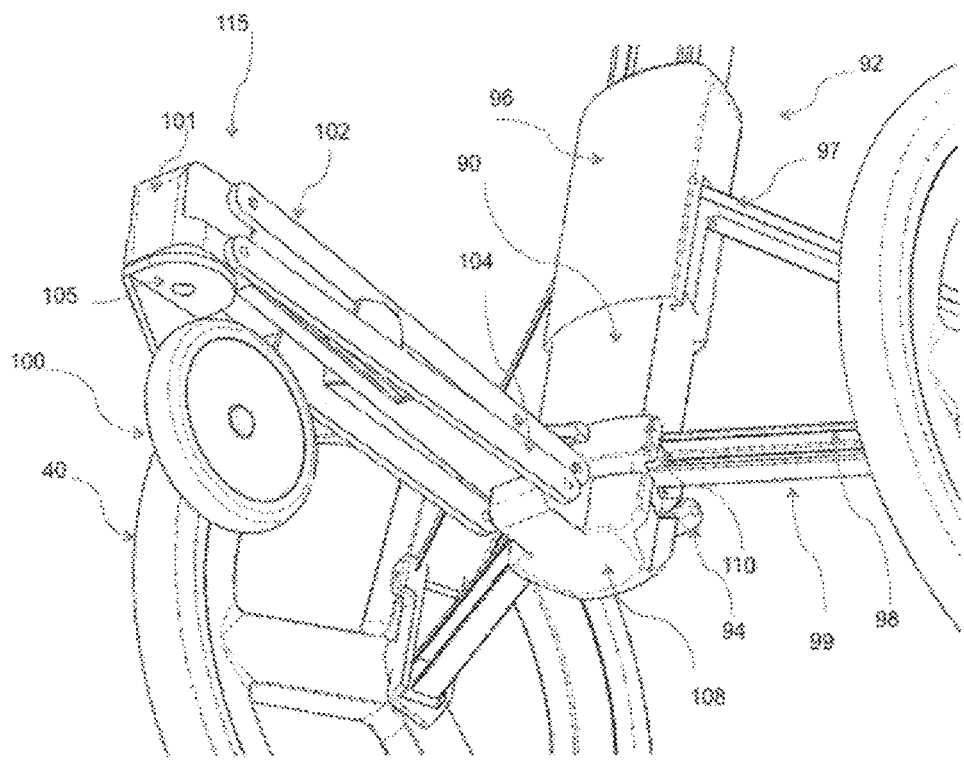
FIG. 13 illustrates a bottom, close-up perspective view of the castor assembly of the modular cart-trailer of FIG. 8, in accordance with an exemplary embodiment of the present invention.

When the modular attachments, such as modular baskets 50, are removed, the modular cart-trailer 88 collapses into a very small form factor, as shown in FIG. 9E. A user initiates a folding mechanism with a foot pedal 94, as illustrated in FIGS. 8 and 13, which then causes all elements of the modular cart-trailer to collapse automatically, in a synchronous manner.

The modular cart-trailer 88 includes various components, namely, a collapsible tow bar 84, a collapsible handle 60, a tripod assembly 92, a castor assembly 115, a modular platform 120, and a modular accessory support system 52. Each of these components and the associated mechanisms are described separately herein.

Figure 4:
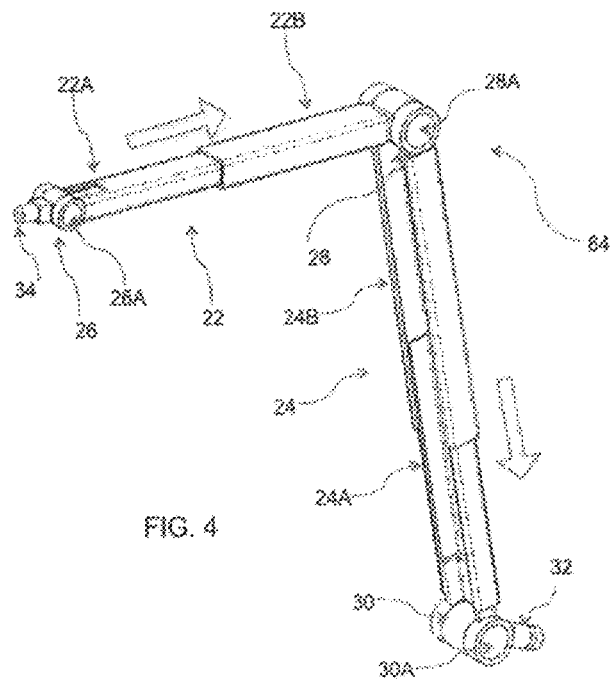
FIG. 4 illustrates a perspective view of the collapsible tow bar of FIG. 1 in a fully extended state, in accordance with an exemplary embodiment of the present invention.
Figure 5:
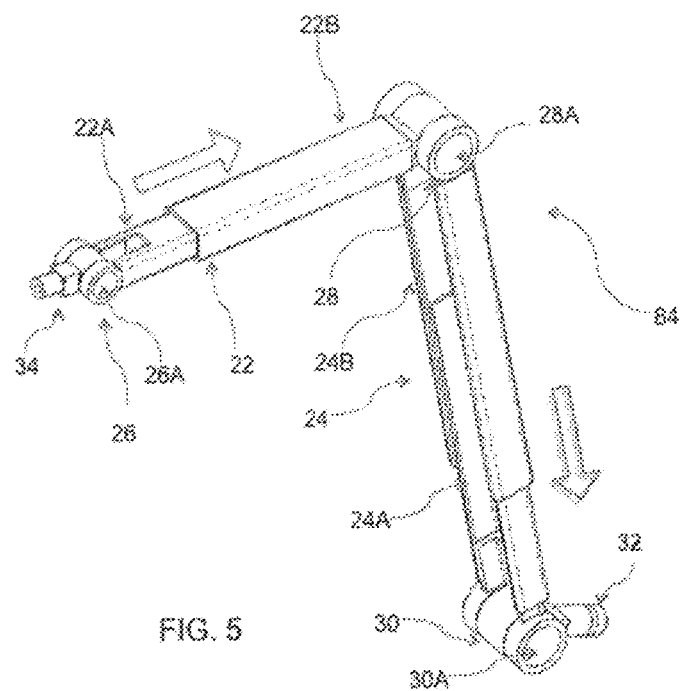
FIG. 5 illustrates a perspective view of the collapsible tow bar of FIG. 1 in a partially collapsed state, in accordance with an exemplary embodiment of the present invention.
Figure 6A:
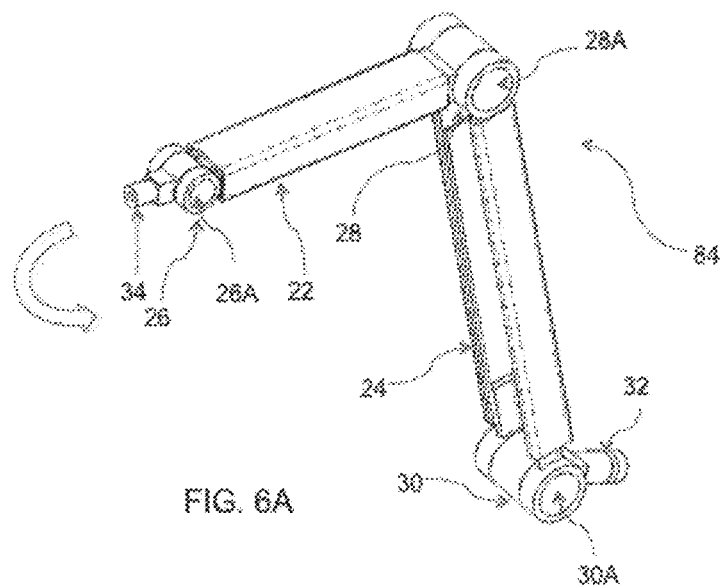
FIG. 6A illustrates a perspective view of the collapsible tow bar of FIG. 1 in a fully collapsed state, in accordance with an exemplary embodiment of the present invention.

The collapsible tow bar 84 is illustrated in a fully extended state in FIG. 4, in a partially collapsed state in FIG. 5, and in a fully collapsed state in FIG. 6A. The collapsible tow bar 84 is of adjustable length in accordance with the size of the bicycle 12. The rear wheel diameter of the bicycle 12 may vary, resulting in a vertical clearance dimension that the collapsible tow bar 84 needs to clear, and a horizontally inclined distance from the bicycle seat post 14 past the rear wheel of the bicycle 12 and any racks that may be attached on top of the rear wheel of the bicycle 12 that the collapsible tow bar needs to clear. As illustrated in FIG. 4, FIG. 5 and FIG. 6A, the collapsible tow bar 84 includes two telescopic channels made from, for example, aluminum, namely, a horizontal telescopic channel 22 which is hollow and closed in its cross-section, and a vertical telescopic channel 24 which is hollow and open in its cross section. A male portion 22A of the horizontal telescopic channel 22 connects to a top angle and length adjuster 26 made of, for example, stainless steel, aluminum and plastic parts, which are include internally a multi-toothed dog clutch. The top angle length adjuster 26 enables rotation in an upward vertical direction and a downward vertical direction, enables the telescoping motion of the horizontal telescopic channel 22, and locks the horizontal telescopic channel 22 into place. The multi-toothed dog clutch of the top angle length adjuster 26 is disengaged by pressing the top angle and length adjuster button 26A, and is engaged again when the top angle and length adjuster button 26A is released. Attached to the outer side of the top angle and length adjuster 26 is a universal hitch mount pin 34, which is keyed to be inserted into the corresponding receptacle in the universal hitch 80. Pressing the top angle and length adjuster button 26A enables adjusting the length of the horizontal telescopic channel 22, by sliding the male portion 22A of the horizontal telescopic channel 22 into or out of the female portion 22B of the horizontal telescopic channel 22, and releasing the top angle and length adjuster button 26A locks it into place.

The female portion 22B of the horizontal telescopic channel 22 connects to a middle angle and length adjuster 28 made of, for example, stainless steel, aluminum and plastic parts, which include internally a multi-toothed dog clutch. The middle angle length adjuster 28 enables rotation in an upward vertical direction and a downward vertical direction, enables the telescoping motion of the vertical telescopic channel 24, and locks the vertical telescopic channel 24 into place. The multi-toothed dog clutch of the middle angle length adjuster 28 is disengaged by pressing the middle angle and length adjuster button 28A, and is engaged again when the middle angle and length adjuster button 28A is released.

A male portion 24A of the vertical telescopic channel 24 connects to a bottom angle adjuster 30 made of, for example, stainless steel, aluminum and plastic parts, including internally a multi-toothed dog clutch. The bottom angle adjuster 30 enables rotation in an upward direction and a downward direction along its axis. Unlike the top angle and length adjuster 26 and the middle angle and length adjuster 28, the bottom angle adjuster 30 does not enable the telescoping motion of any part of the collapsible tow bar 84. The multi-toothed dog clutch of the bottom angle adjuster 30 is disengaged by pressing the bottom angle adjuster button 30A, and is engaged again when the bottom angle adjuster button 30A is released. Pressing the middle angle and length adjuster button 28A enables adjusting the length of the vertical telescopic channel 24 by sliding the female portion 24B of the horizontal telescopic channel 24 into or out of the male portion 24A of the horizontal telescopic channel 24, and releasing the middle angle and length adjuster button 28A locks it into place.

Attached to a rear side of the bottom angle adjuster 30 is a tow bar mount pin 32, which is inserted into a corresponding tow bar mount receptacle 78 on the modular car-trailer 88, as illustrated in FIG. 8. The tow bar mount receptacle 78 includes internally a ball detent which enables rotation around its axis after clicking the tow bar mount pin 32 into place. The female portion 24B of the vertical telescopic channel 24 connects to the downward side of the middle angle and length adjuster 28.

Figure 6B:
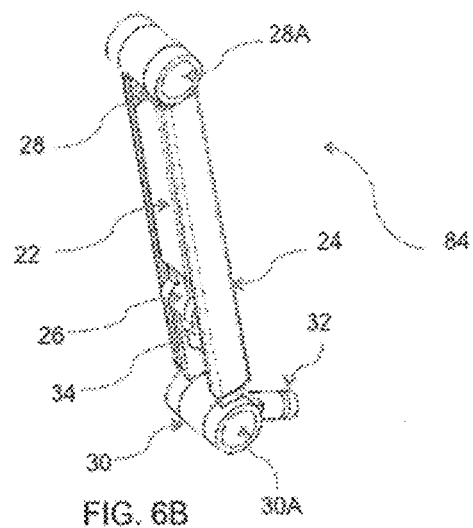
FIG. 6B illustrates a perspective view of the collapsible tow bar of FIG. 1 in a fully collapsed state, with horizontal telescopic channel nested into the vertical telescopic channel, in accordance with an exemplary embodiment of the present invention.

FIG. 4, FIG. 5 and FIG. 6A illustrate the gradual collapsing of the horizontal and vertical telescopic channels 22 and 24 using this telescoping adjustment mechanism described above, from a fully extended state in FIG. 4, to a partially collapsed state in FIG. 5, to a fully collapsed state in FIG. 6A. In FIG. 5, the male portion 22A is partially slid into the female portion 22B and the male portion 24A is partially slid into the female portion 24B. In FIG. 6A, the male portion 22A is fully slid into the female portion 22B and the male portion 24A is fully slid into the female portion 24B. By rotating the horizontal telescopic channel 22 downward towards the vertical telescopic channel 24, as illustrated with the rotational arrow in FIG. 6A, the horizontal telescopic channel 22 may be fully inserted into the inside hollow groove of the vertical telescopic channel 24, as illustrated in FIG. 6B.

A method of installing the collapsible tow bar 84 onto the modular cart-trailer 88 is described herein. First, the tow bar mount pin 32 is installed into the tow bar mount receptacle 78 until the ball detent in the tow bar mount receptacle 78 clicks into place. Second, the middle angle and length adjuster button 28A is pressed to disengage a locking mechanism and multi-toothed dog clutch of the middle angle and length adjuster 28 to simultaneously adjust the vertical telescopic channel 24 to a desired length and a desired angle. The middle angle and length adjuster button 28A is released until the clutch teeth of the angle and length adjuster 28 fully engage and the locking mechanism locks into place. Third, the top angle and length adjuster button 26A is pressed to disengage the multi-toothed dog clutch and locking mechanism of the angle and length adjuster 26 to simultaneously rotationally swing the universal hitch mount pin 34 to a desired angle and location and to adjust the length of the horizontal telescopic channel 22. The top angle and length adjuster button 26A is released until the clutch teeth of the angle and length adjuster 26 fully engage and the length locks into place. Fourth, the bottom angle adjuster button 30A is pressed to disengage a multi-toothed dog clutch of the bottom angle adjuster 30 and change the angle of the collapsible tow bar 84 to a desired location. The bottom angle adjuster button 30A is released and the angle is adjusted until the clutch teeth of the bottom angle adjuster 30 fully engage. Fifth, the modular cart-trailer 88 is tilted and the universal hitch mount pin 34 is slid into the universal hitch 80 attached to the bicycle's seat post 14 until the ball detent in the universal hitch 80 clicks into place.

A method for removing the collapsible tow bar 84 from the bicycle 12, and collapsing it onto the modular cart-trailer 88 along the tripod chassis 90 is described herein. First, the top angle and length adjuster 26 is removed from the universal hitch 80 by sliding the ball retainer slide thereby releasing the ball detent holding the keyed universal hitch mount pin 34 in the top angle and length adjuster 26. Second, the top angle and length adjuster button 26A is pressed to simultaneously disengage the internal multi-toothed dog clutch of the angle and length adjuster 26, swing the keyed universal hitch mount pin 34 into the recess in the horizontal telescopic channel 22, and collapse the length of the horizontal telescopic channel 22 down to the minimum length. Third, the middle angle and length adjuster button 28A is pressed to disengage the internal multi-toothed dog clutch and rotate the horizontal telescopic channel 22 downward to the vertical telescopic channel 24 until it fully folds into a hollow groove of the vertical telescoping channel 24, while simultaneously adjusting vertical telescopic channel 24 to minimum length, as illustrated in FIG. 6B. The middle angle and length adjuster button 28A is released and an angle is adjusted until the clutch teeth of the middle angle length adjuster 28A are fully engaged and the locking mechanism locks in place. Fourth, the bottom angle adjuster button 30A is pressed to disengage the internal multi-toothed dog clutch of the bottom angle adjuster 30 and change the angle of the collapsible tow bar 84 to be parallel with the tripod chassis 90, as illustrated in FIG. 3. The bottom angle adjuster button 30A is released and an angle is adjusted until the clutch teeth fully engage.

The handle 60 is illustrated in FIGS. 9A, 9B, and 9C in the frontal perspective view of the modular cart-trailer 88 with the tripod assembly 92 in a fully collapsed mode. The handle 60, illustrated in FIG. 3, FIG. 8, and FIG. 9A, is made of, for example, aluminum encapsulated in foam, and is attached to the tripod chassis 90 at the top via a handle hinge 65. One function of the handle 60 is to enable a user to direct the motion of the modular cart-trailer 88 when used in the cart mode in an ergonomic manner. A second function of the handle 60 is to host a variety of accessories on a horizontal handle accessory tray 62 to enhance a user's experience. A third function of the handle 60 is to initiate the telescopic release of the vertical extrusion 95 for length adjustment or for folding the modular cart-trailer 88. As illustrated in FIG. 9A, the handle 60 includes a handle accessory tray 62 made of, for example, plastic, a front pull ring telescope release 64 made of, for example, plastic, and a rear pull ring handle release 66 made of, for example, plastic. The handle accessory tray 62 may include a cup holder 67, a PDA holder 68, and a paper and pen holder 69. The rear pull ring handle release 66 is pulled in a grip fashion, to release the latch mechanism internal to the handle hinge 65, thus, allowing the user to fold the handle 60 up to an extended position to adjust the optimal angle for use. The handle 60 can be locked in multiple positions between fully extended and fully collapsed, which is achieved by simply releasing the rear pull ring handle release and moving the handle to its next detent position. FIG. 9A illustrates the handle 60 in an open angle to the vertical extrusion 95. FIG. 9B illustrates the handle 60 in semi-collapsed position. FIG. 9C illustrates the handle 60 in fully collapsed position.

Figure 10:
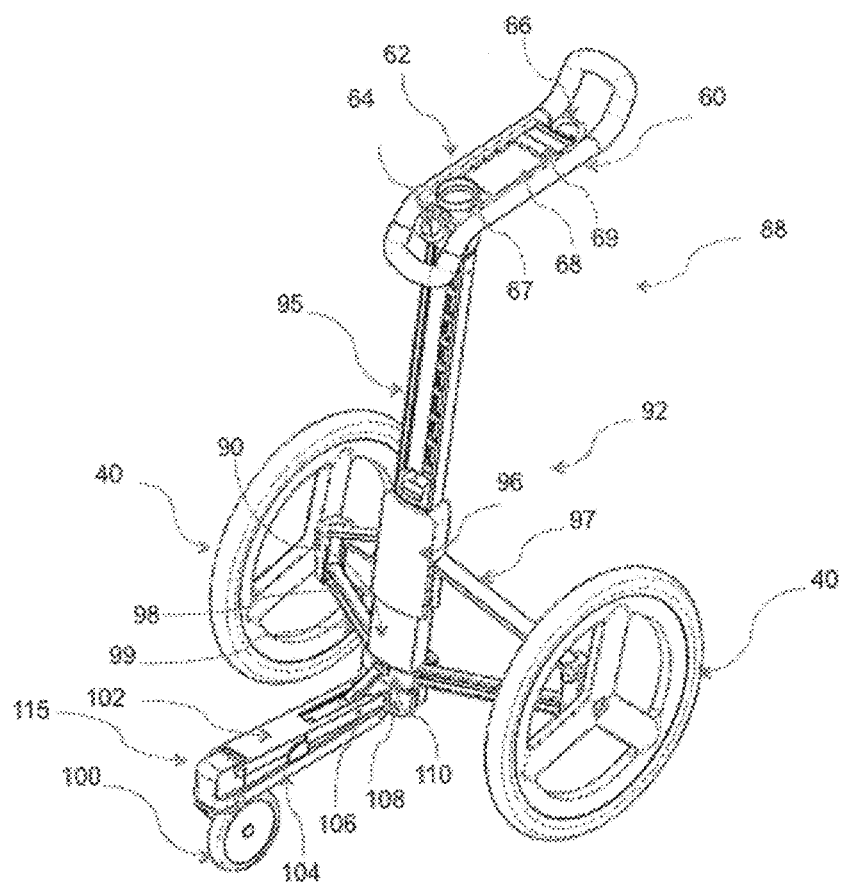
FIG. 10 illustrates a perspective view of a modular cart-trailer of FIG. 8 with a castor assembly in fully open position, in accordance with an exemplary embodiment of the present invention.

The tripod assembly 92 is illustrated in FIG. 8 in a rear, perspective view, in FIG. 10 in a frontal, perspective view, and in FIG. 13 in a bottom, close-up view. The tripod assembly 92 is comprised of several components and also connects to a castor assembly 115. A tripod chassis 90 made of, for example, aluminum, nests a vertical extrusion 95 made of, for example, aluminum. The vertical extrusion 95 telescopes in and out of the tripod chassis 90 to adjust the modular cart-trailer 88 to a desired length during operation, or to collapse the modular cart-trailer 88 for storage. A tripod upper body 96 made of, for example, plastic, partially engulfs the tripod chassis 90, and is attached to left and right rear wheel upper arms 97 made of, for example, aluminum or stainless steel. The left and right rear wheel upper arms 97 connect to the left and right wheels 40, respectively. From the bottom, the tripod chassis 90 is attached to a tripod collapse collar 110 made of, for example, plastic. The tripod collapse collar 110 connects to the castor assembly 115 via a castor wheel actuator 106. The tripod collapse collar 110 is connected to the tripod bottom cap 108, to the left and right rear wheel middle arm 98, respectively, and left and right rear wheel bottom arms 99, respectively. The left and right rear wheel upper arms and the left and right rear wheel bottom arms 99 are made of, for example, aluminum or stainless steel, and connect to the corresponding left and right rear wheels 40, respectively. FIG. 8 illustrates the foot pedal 94 and the tow bar mount receptacle 78 stemming from the rear side of the tripod bottom cap 108.

The castor assembly 115, as illustrated in FIG. 10 and in FIG. 13, includes a caster arm hub 101 made of, for example, aluminum, a caster mount 105 made of, for example, stainless steel, a caster wheel 100 made of, for example, a rubber tire and a plastic wheel, a caster upper arm 102 made of, for example, plastic or aluminum, a caster lower arm 104 made of, for example, plastic or aluminum, a tripod bottom cap 108 made of, for example, plastic or aluminum, a caster wheel actuator 106 made of, for example, stainless steel, and the tripod chassis 90. The caster wheel 100 is coupled to the caster mount 105 with a horizontal pin creating a plain bearing. The caster mount 105 is coupled to the caster arm hub 101 with a vertical pin and a thrust roller bearing element between the two. The caster arm hub 101, caster lower arm 104, caster upper arm 102, and tripod bottom cap 108 are pinned together in a rotationally unconstrained four-bar linkage. The caster upper arm 102 is connected to the tripod chassis 90 by the caster wheel actuator 106. The caster upper arm 102, the tripod chassis 90 and the caster wheel actuator 106 are fastened together by two horizontal pins.

Figure 11:
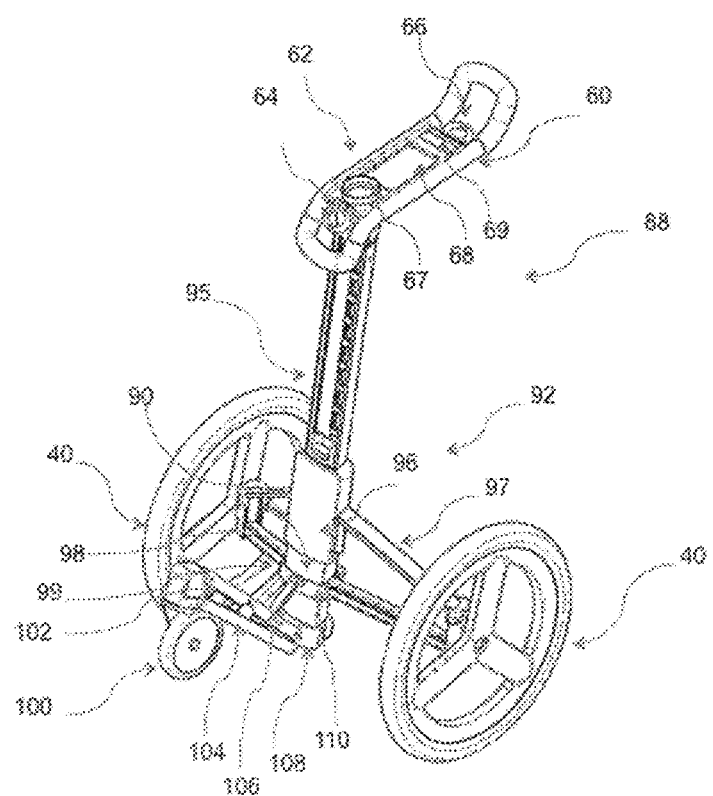
FIG. 11 illustrates a perspective view of a modular cart-trailer of FIG. 10 with a castor assembly in a half collapsed position, in accordance with an exemplary embodiment of the present invention.
Figure 12:
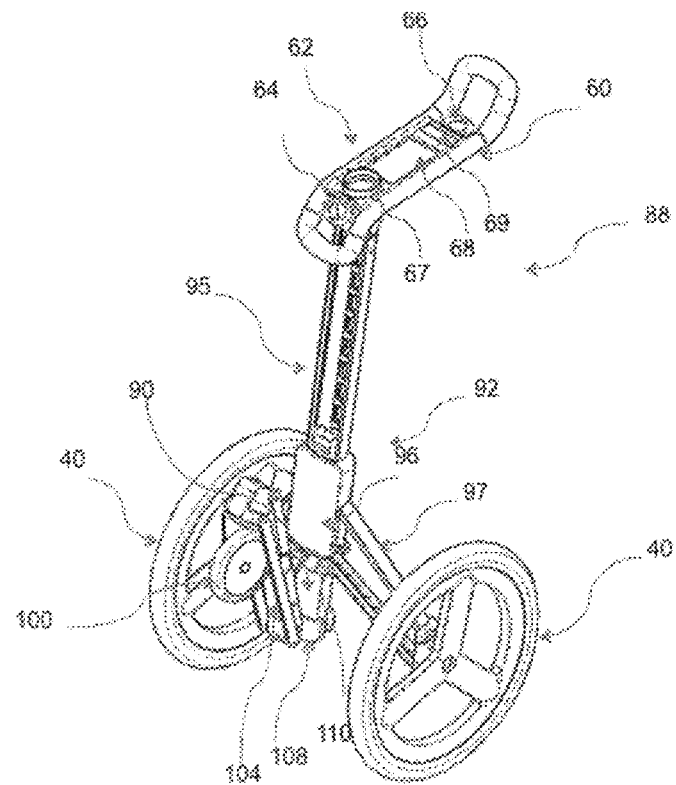
FIG. 12 illustrates a perspective view of a modular cart-trailer of FIG. 10 with a castor assembly in a three quarter collapsed position, in accordance with an exemplary embodiment of the present invention.

When the tripod chassis 90 is moved in an upward direction (as illustrated in FIG. 11 and FIG. 12) the caster wheel actuator 106 pulls on the caster upper arm 102 to cause an upward swinging motion of the entire caster assembly 115. As the caster assembly 115 reaches its fully collapsed position, the caster wheel 100, guided by gravity, folds into a recess in the caster upper arm 102.

Collapsing the modular cart-trailer 88 to its smallest form factor, as illustrated in FIG. 9E, requires several steps involving the tripod assembly 92, the handle 60 rotation, and the telescoping mechanism of the vertical extrusion 95. To initiate the tripod assembly 92 mechanism, the user lifts the foot pedal 94 illustrated in FIG. 8 with their foot while holding handle 60. This causes the foot pedal 94 to disengage the internal locking features that secure the modular cart-trailer 88 in its open, non-collapsed position, as illustrated in FIG. 10. The user continues to lift with their foot under foot pedal 94, as well as lifting on the handle 60, which causes the entire modular cart-trailer 88 to be lifted slightly off the ground. When this happens frictional forces are reduced on the tires of the rear wheels 40, at which point an internal spring causes the wheels 40 to travel inwards and the castor assembly 115 to move upwards beginning the collapsing process, of the tripod assembly 92 mechanism. FIG. 11 illustrates this step in a half-collapsed mode, and FIG. 12 illustrates a three-quarters collapsed mode. The user continues engaging this mechanism until the rear wheels 40, the castor assembly 115, and the tripod assembly 92, are completely collapsed, as illustrated in FIG. 9A. At this point an automated latch engages in the tripod chassis 90 to lock the unit in the closed position once the user's foot is removed from the foot pedal 94. The rear wheels 40 may then be placed back on the ground.

In a second step, the handle 60 is collapsed via its rotating mechanism as described and illustrated in connection with FIGS. 9A, 9B, and 9C.

In a third step, the vertical extrusion 95 is collapsed from its fully extended position as illustrated in FIG. 9C, to a half-collapsed position as illustrated in FIG. 9D, to a fully collapsed position as illustrated in FIG. 9E. In FIG. 9C, the user is presented with the front pull ring telescope release 64 in a more ergonomically ideal position. The vertical extrusion 95 folding mechanism is engaged by pulling on the front pull ring telescope release 64, which releases the internal lock mechanism housed in the tripod upper body 96. Once this lock is released the user can adjust the height of the vertical extrusion 95 to any point in its travel, for example, as illustrated in FIG. 9D, or in a position fully stowed in its smallest collapsed form, as illustrated in FIG. 9E. The vertical extrusion 95 has a number of de-tented locations that it can be used in, which can be selected by releasing the front pull ring telescope release 64 and then pushing or pulling the extrusion until it clicks into position.

Reversing the steps for collapsing the modular cart-trailer 88 expands the modular cart-trailer 88 from totally collapsed form factor as illustrated in FIG. 9E, to a fully expanded mode, as illustrated in FIG. 10.

Figure 14:
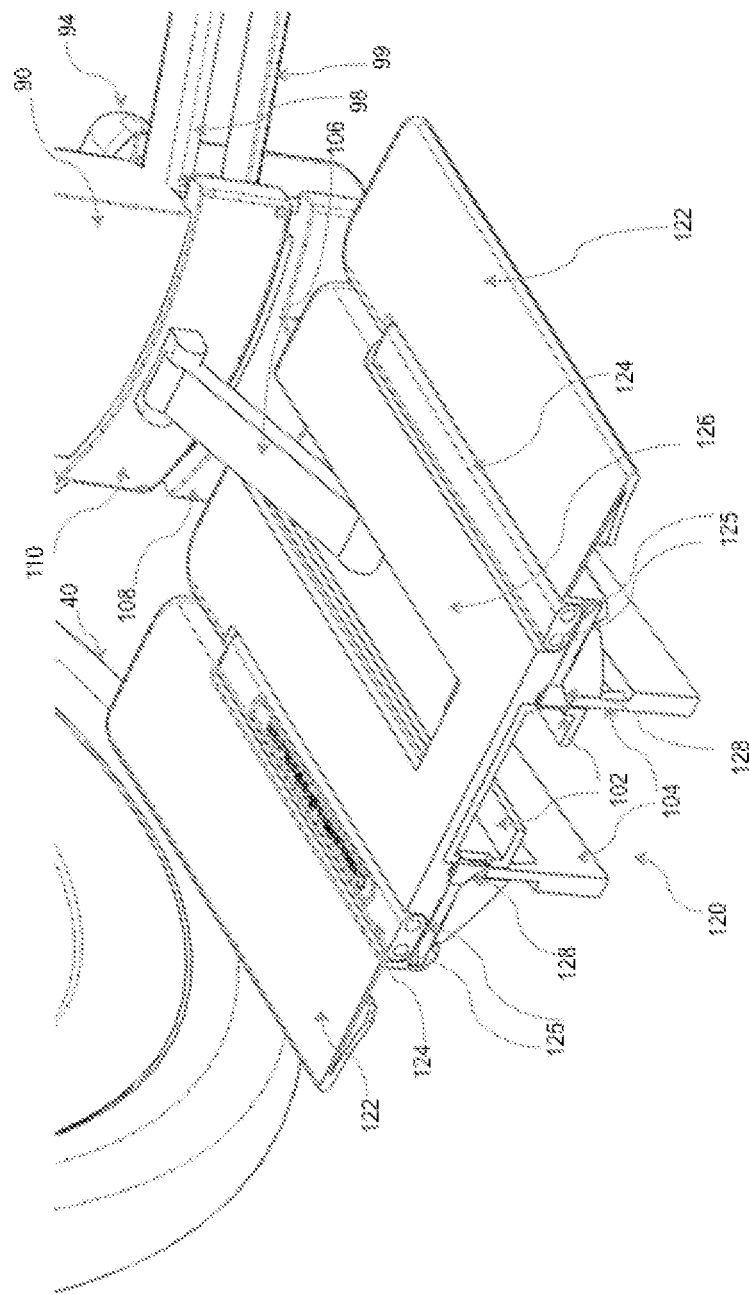
FIG. 14 illustrates a close-up, perspective view of a modular platform, in accordance with an exemplary embodiment of the present invention.
Figure 15:
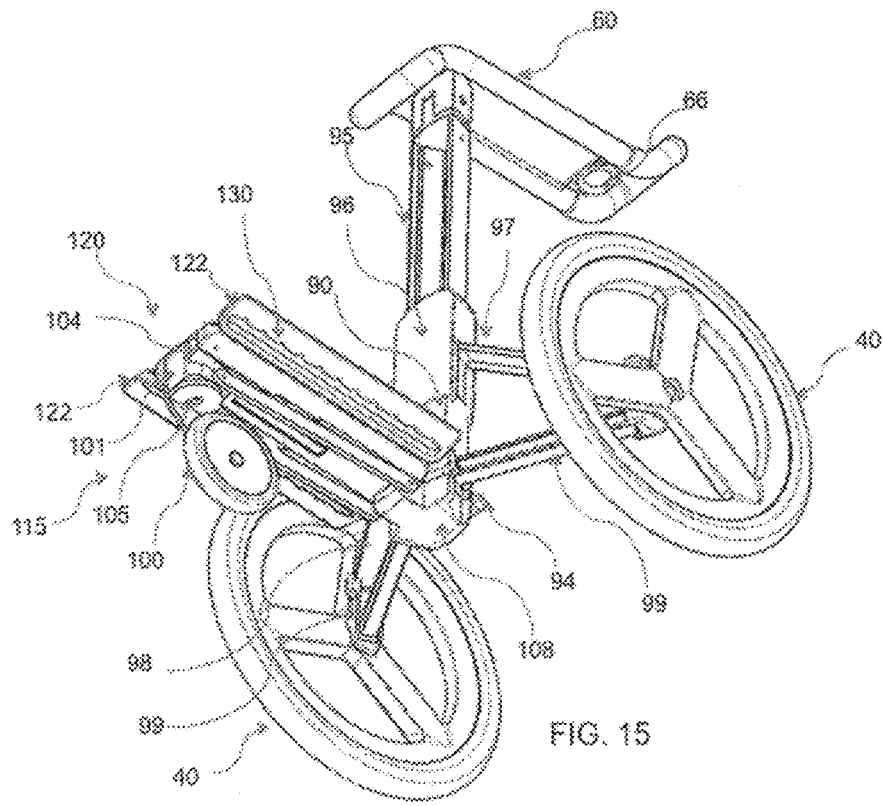
FIG. 15 illustrates a bottom, perspective view of the modular platform of FIG. 14 mounted on top of the castor assembly, in accordance with an exemplary embodiment of the present invention.

The modular platform 120 is illustrated in FIG. 14 in a close-up, perspective view without the full castor assembly 115, and is illustrated in FIG. 15 in a bottom, perspective view mounted onto the full castor assembly 115. The modular platform 120 is a modular element that may optionally be attached to the modular cart-trailer 88 on top of the castor assembly 115. The exemplary function of the modular platform 120 is to hold and secure optional loads. The modular platform 120 is comprised of the platform center section 126 made of, for example, plastic, two platform outer wings 122 made of, for example, plastic, two platform hinges 124 made of, for example, plastic, two release plungers 128, and torsion actuation springs internal to the platform hinges 124. The underside of the platform outer wings 122 features bungee hook detents 130, as illustrated in FIG. 15. One function of the bungee hook detents 130 is to attach versatile load of generic sizes to the modular platform 115 via bungee cords. The platform outer wings 122, platform hinges 124, and torsion actuation springs are attached to the platform center section 126 with platform hinge pins 125 made of, for example, steel, in four locations, as illustrated in FIG. 14. The platform interlocks with the caster upper arm 102 to form a rigid assembly. Due to the resulting rigid assembly, the modular platform 120 is made to automatically collapse upon initiation of the tripod assembly 92 collapsing mechanism.

Figure 16:
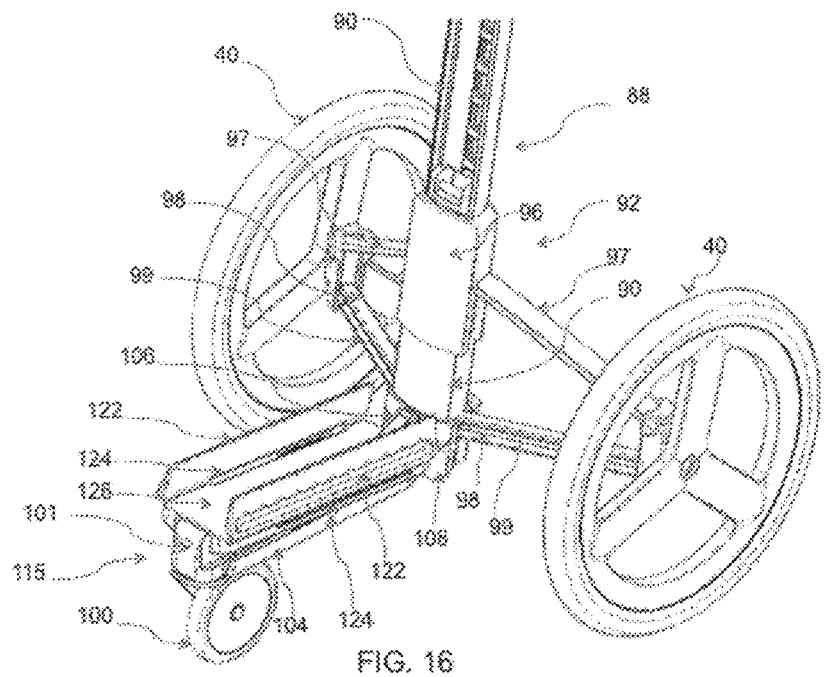
FIG. 16 illustrates a perspective view of the modular platform of FIG. 14 in a partially collapsed mode, in accordance with an exemplary embodiment of the present invention.
Figure 17:
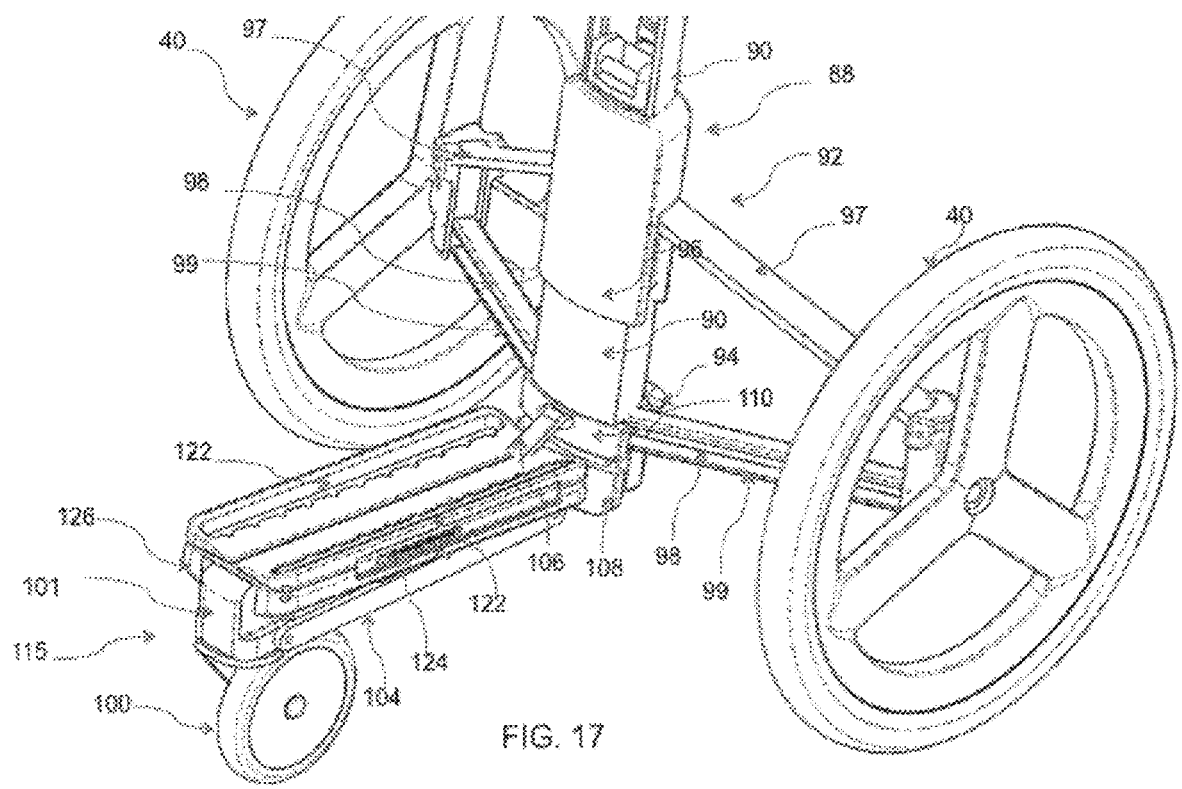
FIG. 17 illustrates a perspective view of the modular platform of FIG. 14 in a fully collapsed mode, in accordance with an exemplary embodiment of the present invention.

To initiate the tripod assembly 92 collapsing mechanism, as described above, the user lifts the foot pedal 94 illustrated in FIG. 8 with their foot while holding handle 60, which causes the foot lever to disengage the internal locking features and initiate the collapse of the modular platform 120 via the upper castor arms 102. When the upper caster arms 102 and suspension initiate collapse, ramped 'cam' features located on the top surface of the caster lower arms 104 contact mating cam surfaces on the ends of the platform release plungers 128 and force them to retract. When the platform release plungers 128 retract, the platform hinges 124 and platform outer wings 122 simultaneously fold upwards and inwards due to forces from the internal torsion actuation springs, to close and lie on top of the platform center section 126. This is illustrated in FIG. 16 in which the platform outer wings 122 are in a half closed state, and in FIG. 17 in which the modular platform 120 is in a fully closed state with the platform outer wings 122 fully folded on top of the castor assembly 115.

The modular platform 120 is not self deploying during the action of expanding the modular cart-trailer 88. To use the modular platform 120 the user must manually unfold the two platform outer wings 122 by hand, by charging the internal torsion springs that deploy the wings. The platform release plungers 128 on each side of the modular platform 120 automatically grab the platform outer wings 122 as they reach full deployment. This is illustrated via the reverse sequence of the fully collapsed platform outer wings 122 illustrated in FIG. 17, to the partially open platform outer wings 122 illustrated in FIG. 16, to the fully open platform outer wings 122 illustrated in FIG. 15.

Figure 18:
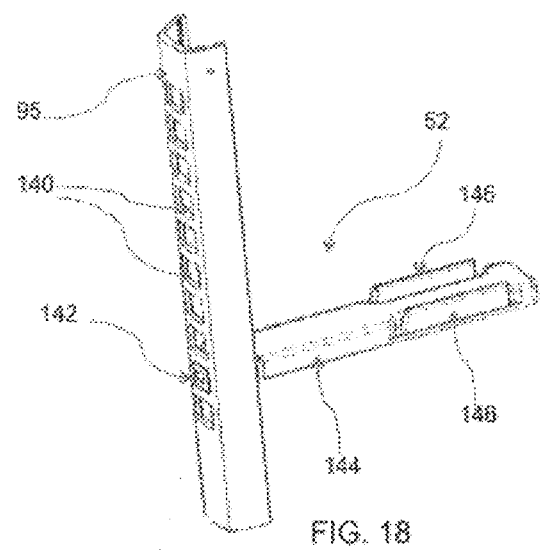
FIG. 18 illustrates a close-up, perspective view of the modular accessory support system, in accordance with an exemplary embodiment of the present invention.
Figure 21A:
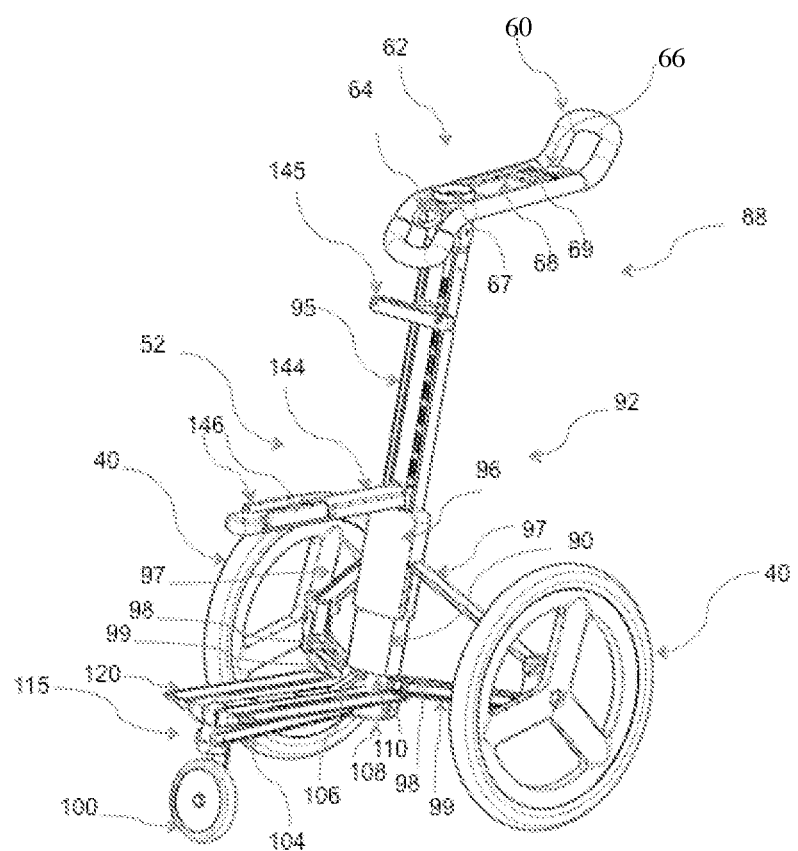
FIG. 21A illustrates a perspective view of the modular cart-trailer of FIG. 1 with the modular platform and accessory upper and lower arms attached, in accordance with an exemplary embodiment of the present invention.
Figures 21B, 21C:
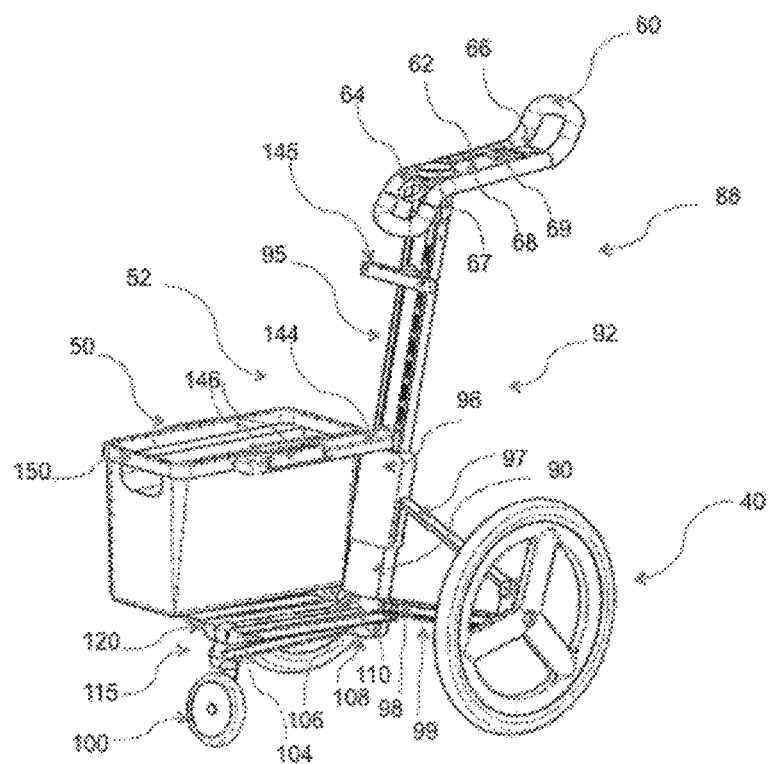
FIG. 21B illustrates a perspective view of the modular cart-trailer of FIG. 21A with one modular basket attached to the accessory lower arm, in accordance with an exemplary embodiment of the present invention.
FIG. 21C illustrates a perspective view of the modular cart-trailer of FIG. 21A, with two modular baskets attached to the accessory lower arm, in accordance with an exemplary embodiment of the present invention.

The modular accessory support system 52 is illustrated in FIG. 18, and is intended to allow the modular cart-trailer 88 to be personalized to suit a number of different uses and tasks, ranging from the modular platform 120 with built-in bungee hook detents 130, described herein, to the modular baskets 50 as illustrated in FIGS. 7, 21B, and 21C for carrying goods or shopping, to any number of other possible embodiments such as a laundry hamper, pizza bag, and other such storage devices.

Figure 19A:
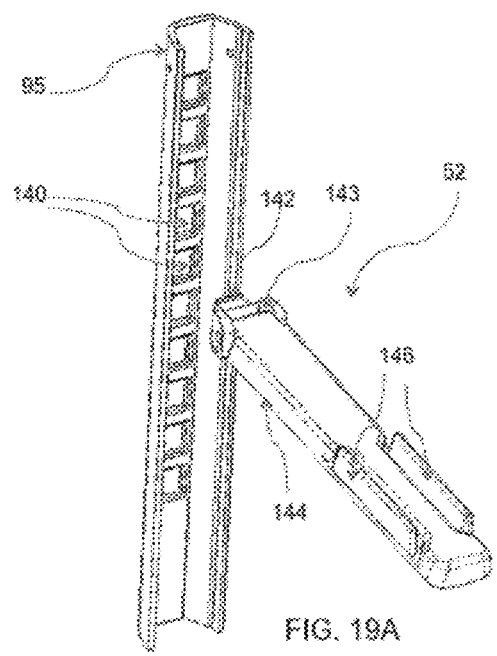
FIG. 19A illustrates a close-up, perspective view of the modular accessory support system of FIG. 17 with the accessory lower arm unattached, in accordance with an exemplary embodiment of the present invention.

The modular accessories are installed into the modular accessory system 52 via vertical extrusion holes 140, as illustrated in FIGS. 18 and 19A. The accessory lower arm 144 is part of the modular accessory support system 52, and includes a narrow platform made of, for example, plastic, two accessory male mounts 146 made of, for example, plastic, an accessory mounting block 143 made of, for example, plastic, and an accessory release button 142 made of, for example, plastic. To install the accessory lower arm 144 onto the modular accessory mounting system 52, the user holds the accessory lower arm 144 and aligns the end with the accessory mounting block 143 with a vertical extrusion hole 140 in the vertical extrusion 95. The user then rotates the accessory lower arm 144 arm and accessory mounting block 143 up to an angle of 45 degrees in order to enable insertion of an upper tongue of the accessory mounting block 143 into the vertical extrusion hole 140 in the vertical extrusion 95. Once the tongue of the accessory mounting block 143 is engaged, the user rotates the accessory mounting block 143 and accessory lower arm 144 back down to a horizontal position. At the horizontal location a pair of spring loaded detents located inside the accessory mounting block 143 engage into two vertical grooves located on the inside face of the vertical extrusion 95, thereby locking the accessory mounting block 143 and accessory lower arm 144 in an attached and functional position.

Figures 19B, 19C:
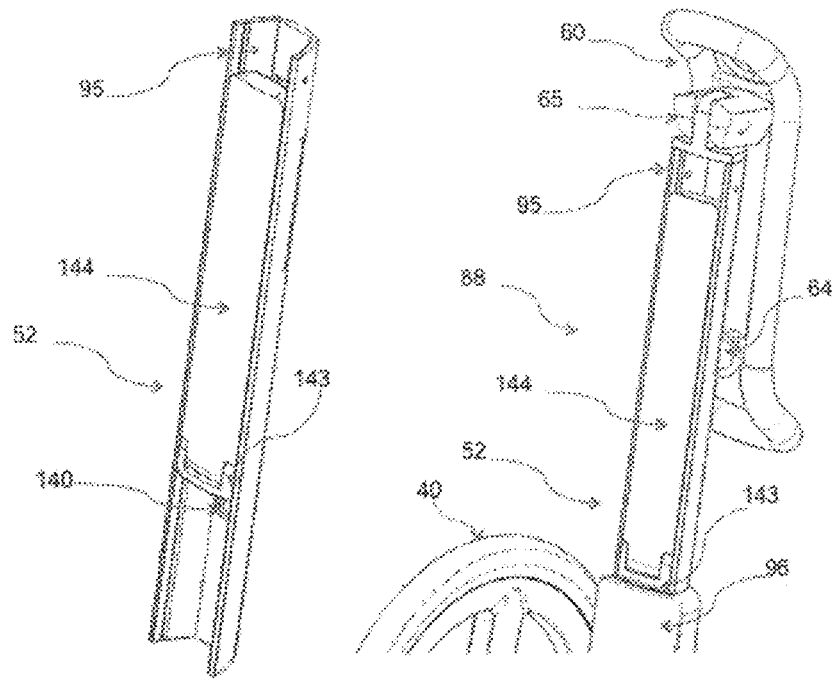
FIG. 19B illustrates a close-up, perspective view of the modular accessory support system of FIG. 17 with the accessory lower arm stowed into the vertical extrusion, in accordance with an exemplary embodiment of the present invention.
FIG. 19C illustrates a close-up, perspective view of the modular accessory support system of FIG. 17 with the accessory lower arm stowed into a partially collapsed vertical extrusion, in accordance with an exemplary embodiment of the present invention.

The accessory lower arm 144 has two positions for use, deployed for use position, as is illustrated in FIGS. 18, 20A, 20B, 21A, 21B, and 21C, and the stowed position, as is illustrated in FIGS. 19B and 19C, when inserted inside the inner cavity of the vertical extrusion 95. The user may set the accessory lower arm 144 in either position manually by simply lifting or lowering the accessory lower arm 144 from a vertical to a horizontal position by simply engaging an internal ball detent latch at either end of the travel of the arm. The accessory lower arm 144 has the ability to automatically fold up into the cavity of the vertical extrusion 95 as the user initiates the collapsing of the vertical extrusion 95 into the tripod upper body 96. As the vertical extrusion 95 is extended, the accessory lower arm 144 will automatically deploy under light spring pressure, created by an internal torsion spring in the accessory mounting block 143. Alternatively, the user may manually deploy or store the accessory lower arm 144.

To remove the accessory lower arm 144 from the modular accessory mounting system 52, the user holds the accessory lower arm 144 and accessory mounting block 143, while pressing the accessory release button 142 located on the back face of the accessory mounting block 143 and locked into a vertical extrusion hole 140. By pressing the accessory release button 142, a mechanism internal to the accessory mounting block retracts the two internal spring loaded ball detents that hold the accessory mounting block 143 inside the vertical extrusion hole 140. While pressing the accessory release button 142, the user then rotates the accessory lower arm 144 and accessory mounting block 143 up to an angle of 45 degrees to allow the accessory lower arm 144 to be withdrawn in a linear fashion from the vertical extrusion hole 140 in the vertical extrusion 95.

Figure 20A:
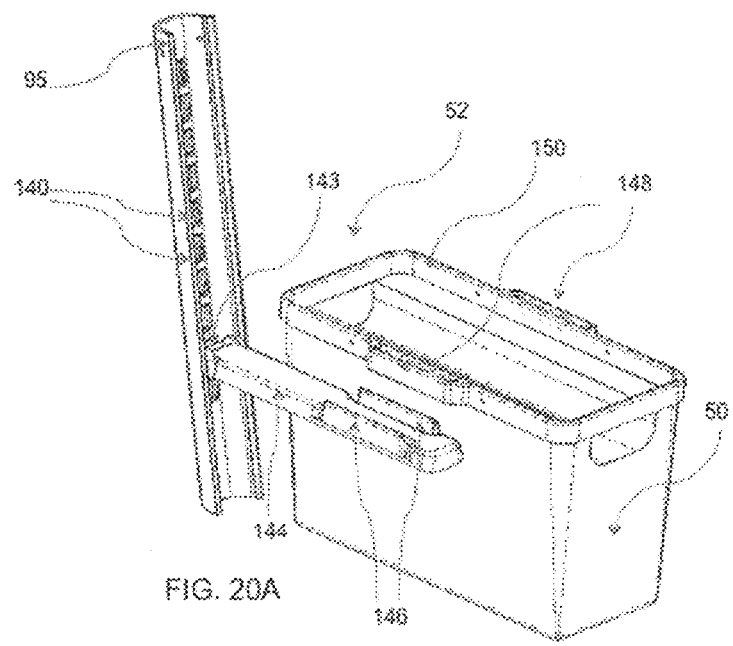
FIG. 20A illustrates a close-up, perspective view of the modular accessory support system of FIG. 17 with a modular basket unattached, in accordance with an exemplary embodiment of the present invention.
Figure 20B:
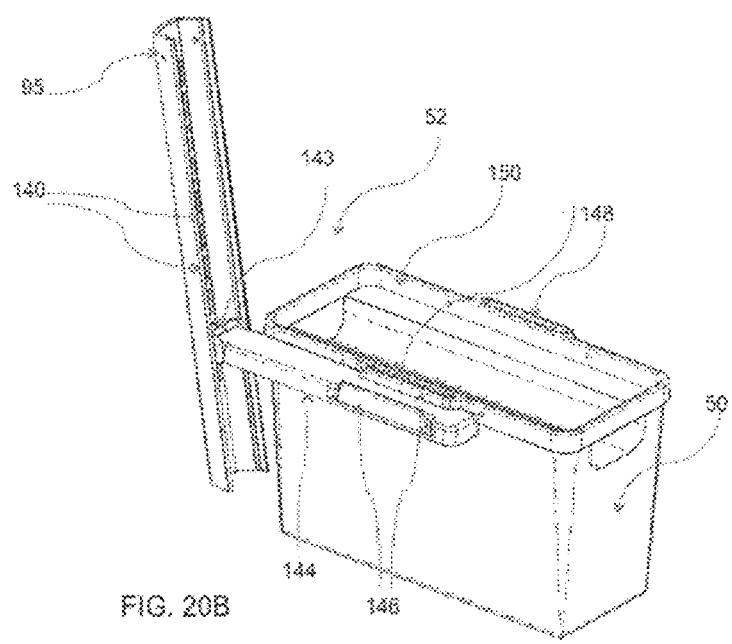
FIG. 20B illustrates a close-up, perspective view of the modular accessory support system of FIG. 17 with a modular basket attached, in accordance with an exemplary embodiment of the present invention.

FIGS. 20A and 20B illustrate an exemplary modular accessory, specifically a modular basket 50, comprised of a soft container made of, for example, fabric, hung from a horizontal basket accessory frame 150 made of, for example, plastic, and two accessory female mounts 148 made of, for example, plastic. The modular basket 50 is mounted onto the accessory lower arm 144 by pressing the accessory female mount 148 onto the accessory male mount 146, which then locks in place. To dismount the modular basket 50 from the accessory lower arm 144, the user presses inwards onto to the top of the protruding part of the accessory male mount 146, toward the center of the accessory lower arm 144, and simultaneously lifts the modular basket 50 by its basket accessory frame 150.

The system described herein for installation and removal of the accessory lower arm into and from the modular accessory support system 52, respectively, as well as for mounting and dismounting modular baskets, may be used for all modular accessories, such as the accessory upper arm 145, illustrated in FIGS. 21A, 21B, and 21C. In FIG. 21A, both an accessory lower arm 144 and an accessory upper arm 145 made of, for example, plastic, are installed onto the vertical extrusion 95, but no baskets are mounted. FIG. 21B illustrates this same configuration of the modular cart-trailer 88 with one modular basket 50 mounted onto the right side of the accessory lower arm 144. FIG. 21C illustrates this same configuration of the modular cart-trailer 88 with two modular baskets 50 mounted onto both sides of the accessory lower arm 144. FIG. 7 illustrates this same configuration of the modular cart-trailer 88 with two modular baskets 50 mounted onto both sides of the accessory lower arm 144, and one modular basket 50 mounted onto the accessory upper arm 145.

While this invention has been particularly shown and described with references to preferred embodiments thereof, it will be understood to those skilled in the art that various changes in form and details may be made herein without departing from the spirit and scope of the invention as defined in the appended claims.

The invention claimed is:

1. A universal multi-modal utility cart for transporting goods, comprising:
   a central column structure including one or more holes;
   a folding mechanism that folds the utility cart toward the central column structure and into a small form factor;
   at least two wheels operatively connected to the central column structure;
   a modular accessory support system comprising:
      a mounting block configured for insertion into one of the one or more holes of the central column structure;
      a support arm connected at a first end to the mounting block;
      first and second accessory mounts positioned at a second end of the support arm; and
   one or more modular accessories for providing interchangeable, modular, removable and compartmentalized storage, each of the modular accessories having at least one mating accessory mount configured to mate with at least one of the first and second accessory mounts;

wherein the utility cart is operable by multiple modes of transportation.

2. The utility car of claim 1, wherein the folding mechanism automatically folds the modular accessory support system when folding the utility cart.

3. The utility cart of claim 2, wherein the one or more modular accessories comprise modular baskets and the modular baskets are removable from the modular accessory support system with and without loaded goods.

4. The utility cart of claim 1, wherein the mounting block further comprises at least one spring-loaded detent for engaging the central column structure.

5. The utility cart of claim 1, wherein the utility cart is operable via a cart mode.

6. The utility cart of claim 1, wherein the utility cart is operable in a trailer mode by hitching the utility cart to a movable object.

7. The utility cart of claim 6 wherein the movable object is a bicycle.

8. The utility cart of claim 6, wherein the cart is hitched to the movable object using a collapsible and extendable tow bar.

9. The utility cart of claim 8, wherein the tow bar is connected to the movable object by a hitch.

10. The utility cart of claim 6, wherein the tow bar is adjustable in length and telescoping.

11. The utility cart of claim 1, wherein the storage comprises loads of variable shapes and sizes.

* * * * *